United States Patent [19]

Pingry

[11] Patent Number: 5,406,897
[45] Date of Patent: Apr. 18, 1995

[54] PLANTER WITH NARROW ROW SPACING CAPABILITY

[75] Inventor: Larry J. Pingry, Celina, Ohio

[73] Assignee: AGCO Corporation, Norcross, Ga.

[21] Appl. No.: 57,142

[22] Filed: Apr. 30, 1993

[51] Int. Cl.$^6$ .............................................. A01C 5/06
[52] U.S. Cl. ................................. 111/59; 111/52; 111/62
[58] Field of Search ............. 111/52, 53, 57, 59, 111/60, 61, 62, 134, 135, 63, 66, 67, 70; 172/250, 253, 310, 462, 776, 629, 646, 659, 683

[56] References Cited

U.S. PATENT DOCUMENTS

| | | |
|---|---|---|
| 3,888,387 | 6/1975 | Deckler . |
| 4,273,057 | 6/1981 | Pollard . |
| 4,450,979 | 5/1984 | Deckler . |
| 4,461,356 | 7/1984 | Larson . |
| 4,539,921 | 9/1985 | Morlock ........................... 172/253 |
| 4,646,851 | 3/1987 | Duello ............................... 172/776 |
| 4,648,334 | 3/1987 | Kinzenbaw ....................... 111/52 |
| 4,771,713 | 9/1988 | Kinzenbaw ....................... 111/52 |

Primary Examiner—Randolph A. Reese
Assistant Examiner—Spencer Warnick
Attorney, Agent, or Firm—Biebel & French

[57] ABSTRACT

A planting implement is disclosed which is operable for performing both row crop and drill planting operations. The implement includes a front planting structure which is detachably coupled to a rear planting structure. The front planting structure includes a front gang of planter units and the rear planting structure includes first and second gangs of planting units wherein the planting units of each gang include a furrow opener and a seed metering unit. The planter units provide accurate seed depth control as well as singulation and precise positioning of seeds along each row. In addition, the planting implement is formed as a compact structure in a longitudinal direction to ensure that a consistent spacing between planted rows of seeds is provided during use of the implement.

23 Claims, 4 Drawing Sheets

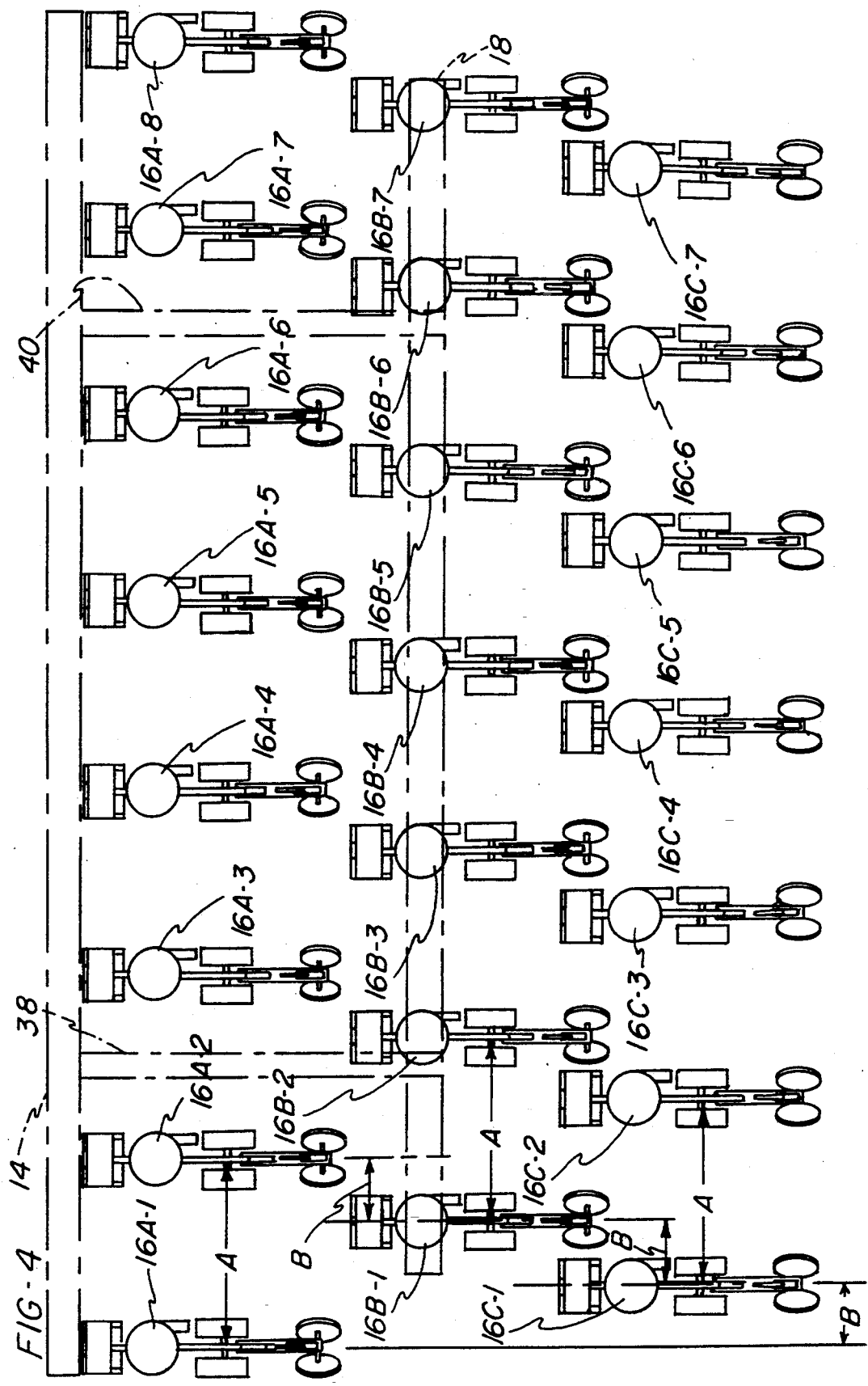

PLANTER WITH NARROW ROW SPACING CAPABILITY

BACKGROUND OF THE INVENTION

1. Field of the Invention

This invention relates to an agricultural planting implement and, more particularly, to a planting implement which is operable to plant row crops such as corn and which is further operable to operate as a grain drill to plant narrow spaced crops such as soybean, wheat and oats.

2. Description of the Prior Art

Two types of seeding machinery commonly used by modern farmers are row crop planters and grain drills, both of which are adapted to place seeds in rows. The row crop planter is typically used for planting crops in rows with spacings of 30 to 40 inches such that the crops may be easily cultivated to control weeds. The spacing provided by row crop planters also facilitates the harvesting of such crops as corn and sorghum which are most effectively harvested by machine when in widely spaced rows.

A commonly used row crop planter includes a plurality of planter units which are attached to a tool bar wherein the planter units each include a furrow opener, a seed metering and placement system, a seed depth control and a seed covering and packing device. The operation of the row crop planter is characterized by providing accurate depth control of the seeds placed within the furrows and by providing accurate individual seed placement, or singulation, whereby the crop yield is maximized by precisely positioning the seeds in spaced relationship to each other in the rows. The furrow depth is typically controlled by a double disk furrow opener having a gauge wheel located on either side thereof wherein the gauge wheels follow the contour of the soil to ensure that a substantially uniform furrow depth is formed. In addition, each planter unit is typically mounted for vertical movement relative to the tool bar to facilitate operation of the furrow opener and gauge wheels in producing a uniform furrow depth.

As noted above, a drill provides a narrower row spacing for crops such as soybean, wheat and oats wherein the rows are typically spaced approximately 7 to 10 inches apart. In order to obtain the narrow spacing between rows, the construction of a drill typically comprises a plurality of closely spaced furrow openers and depth control means, such as a pair of narrow gauge wheels or a single wide gauge wheel, adjacent to the openers. The narrow spacing between the rows dictates a narrow total width for the gauge wheel (or wheels) associated with each furrow opener, as compared to the total gauge wheel width for each planter unit of a row crop planter, resulting in a less accurate seed placement depth for drill planted seed.

Drills also typically include relatively lengthy feed tubes extending from a seed supply and metering area of the drill to the furrow opener. The lengthy feed tubes are necessitated by the close spacing between rows which prevents positioning of metering units, which may be relatively wide, in close proximity to the furrow openers. As a result of conveying seeds through the lengthy feed tubes, seeds commonly become grouped together as they travel through the tubes such that seed singulation is difficult or impossible to assure in a drill.

In addition, the space limitations of a drill usually prevent a coulter blade from being mounted to the individual planter units for preventing accumulation of trash at the furrow opener. In contrast, row crop planters are commonly provided with a coulter blade associated with each planter unit wherein the coulter blades cut through trash or crop residue in untilled land to facilitate use of the row crop planter in an untilled soil condition.

It is further known to provide an additional gang of planter units attached to the rear of a conventional row crop planter in order to provide an extra row between each row of seeds planted by the row crop planter. However, while such a set-up increases the number of rows planted, the minimum row spacing obtained by this arrangement is approximately 15 inches and it is desirable to obtain row spacings at least as low as 10 inches in order to maximize the yield from a given plot of land.

Therefore, there is a need for a planting implement which provides the advantages of accurate depth control and precise seed metering associated with a row crop planter, and which provides narrow row crop spacing whereby the advantages of drill planting are obtained.

SUMMARY OF THE INVENTION

The present invention is an agricultural planting implement which provides for conventional row planting of wide row crops and for drill planting of narrow row crops. In addition, the present invention comprises a planting implement which combines the advantage of accurate seed placement and depth control normally associated with row crop planters with the advantage of narrow row crop placement normally associated with drills.

In one aspect of the invention, an agricultural planting implement is provided which includes an elongated interplant frame extending in a lateral direction with a first gang of planter units mounted to the interplant frame and extending in the lateral direction. A second gang of planter units is mounted to the interplant frame spaced rearwardly from the first gang of planter units wherein the second gang of planter units is offset from the first gang of planter units in the lateral direction. In addition, each planter unit is comprised of a furrow opener and a seed metering unit to provide accurate spacing between seeds within each row.

In a further aspect of the invention, the agricultural planting implement comprises a front planting structure including an elongated base frame extending in the lateral direction and a front gang of planter units extending rearwardly from the base frame. The interplant frame and first and second gangs of planter units define a rear planting structure which is detachably coupled to the front planting structure. The planter units of the front planting structure are spaced from each other a sufficient distance to provide for row crop planting of crops such as corn and sorghum which require a minimum row spacing of approximately 30 inches.

The planter units of the rear planting structure are positioned so as to provide at least two rows in between adjacent rows formed by the front planting structure whereby the planting implement is adapted to be used for a drill planting operation in addition to a row crop planting operation. In the preferred embodiment, the second gang of planter units is offset from the first gang of planter units a predetermined distance in the lateral direction wherein the predetermined distance is substantially equal to one-third the spacing between adjacent planter units of the front gang of planter units. Further, the front gang of planter units is preferably offset from the first gang and the second gang of planter units a distance equal to the predetermined distance in the lateral direction to provide a plurality of equally spaced rows across the planting implement.

It is therefore a primary object of the present invention to provide an agricultural planting implement for planting drill spaced rows of crops wherein accurate seed metering and placement depth is provided for the seeds of each row.

It is a further object of the present invention to provide such a planting implement wherein the frame arrangement for the planter has the flexibility to provide different row configurations by reconfiguring the frame such that either a row crop or a drill or narrow row crop planting operation may be performed while retaining the advantages associated with conventional row crop planters and drill planters.

Other objects and advantages of the invention will be apparent from the following description, the accompanying drawings, and the appended claims.

BRIEF DESCRIPTION OF THE DRAWINGS

FIG. 4 is a diagrammatic top plan view showing the location of the planter units relative to each other and wherein the supporting frame structure is shown in phantom lines.

DETAILED DESCRIPTION OF THE PREFERRED EMBODIMENT

Figure 1:
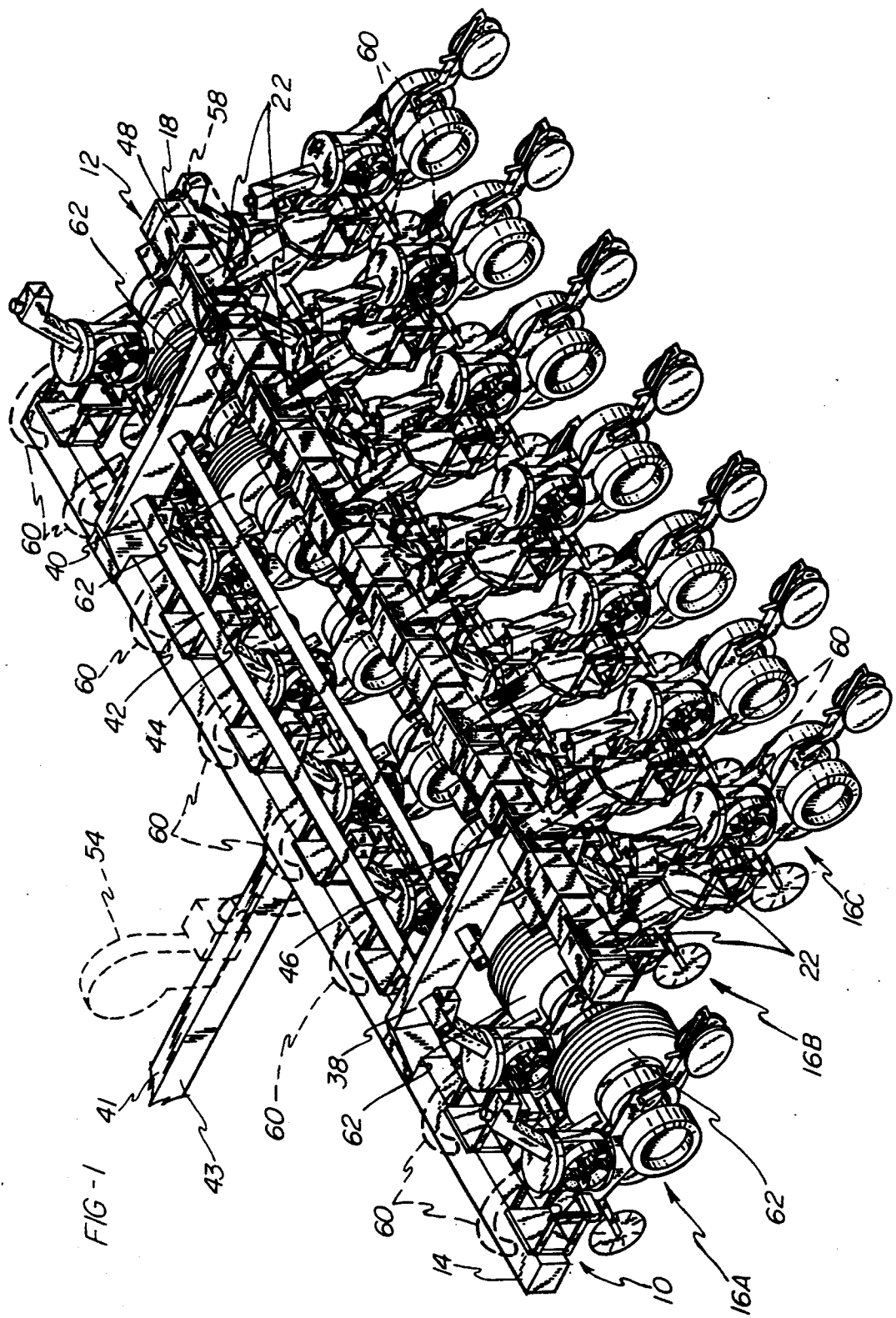
FIG. 1 is a rear perspective view of the planting implement of the present invention.

Referring to FIG. 1, the agricultural planting implement of the present invention is shown configured to perform a drill planting operation. The planting implement includes a front planting structure 10 which is detachably coupled to a rear planting structure 12. The front planting structure 10 includes an elongated base frame 14 extending in a lateral direction, and the rear planting structure 12 includes an elongated interplant frame 18 extending in the lateral direction parallel to the base frame 14. First support arm means comprising first support arms 20 (see also FIGS. 2 and 3) extend downwardly and forwardly from the interplant frame 18, and second support arm means comprising second support arms 22, identical to the first support arms 20, extend downwardly and rearwardly from the interplant frame 18.

A plurality of planter units, referred to generally by reference numeral 16, are mounted to the front and rear planting structures 10, 12. The planter units 16 are grouped in laterally extending gangs, referred to by a letter designation of A, B, or C, wherein the front planting structure 10 includes a front gang of planter units 16A mounted to and extending rearwardly from the base frame 14, and the rear planting frame 12 includes a first gang of planter units 16B extending rearwardly from the first support arms 20 and a second gang of planter units 16C extending rearwardly from the second support arms 22. In addition, the individual planter units 16 in each gang of planter units 16A, 16B and 16C are provided with a numeric designation, such that the front gang of planter units 16A includes planter units 16A-1 through 16A-8, and the first and second gangs of planter units 16B and 16C include planter units 16B-1 through 16B-7 and 16C-1 through 16C-7, respectively, as seen in FIG. 4.

Figure 2:
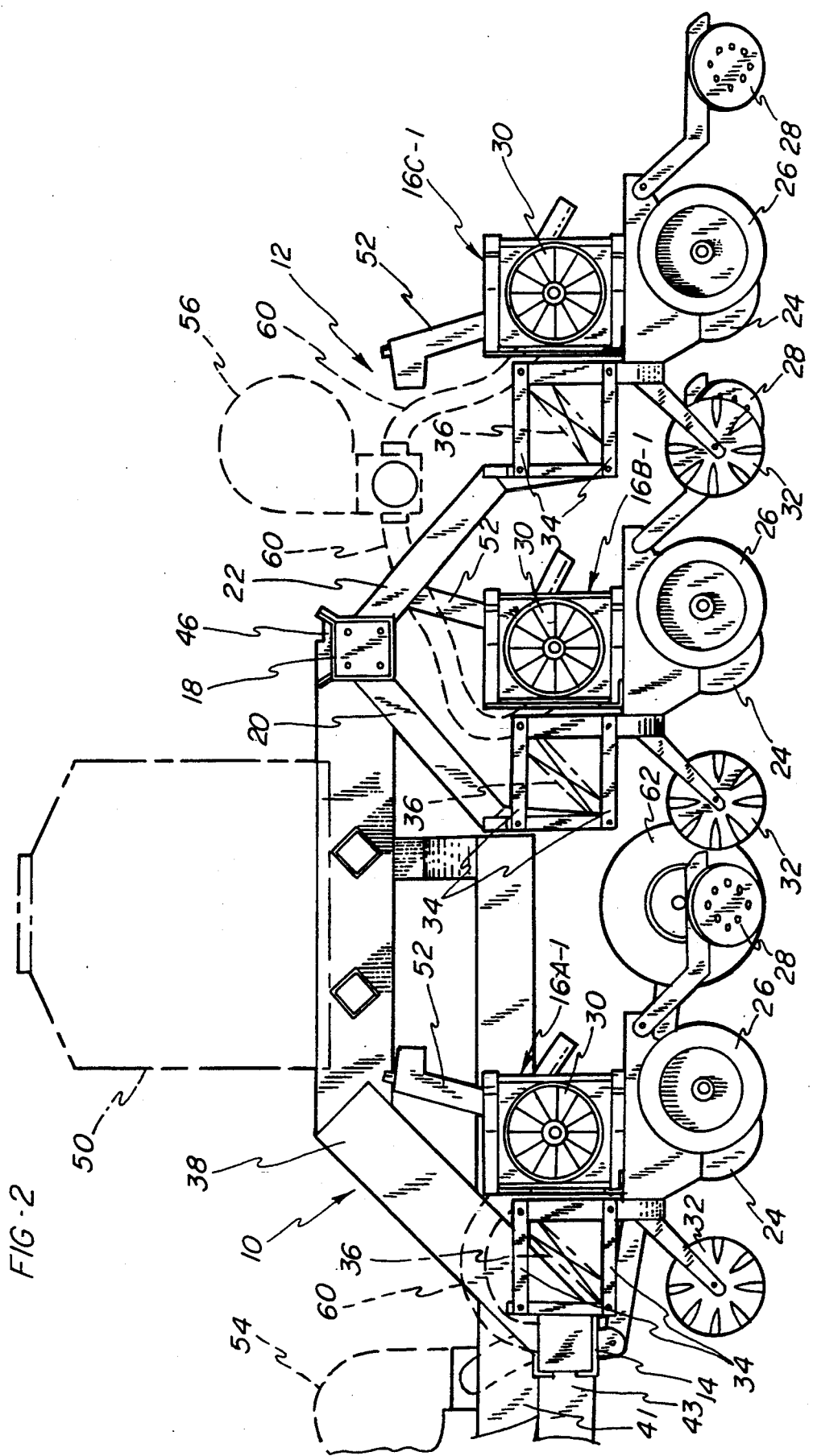
FIG. 2 is a side elevational view showing the front and rear planting structures of the planting implement coupled together.
Figure 3:
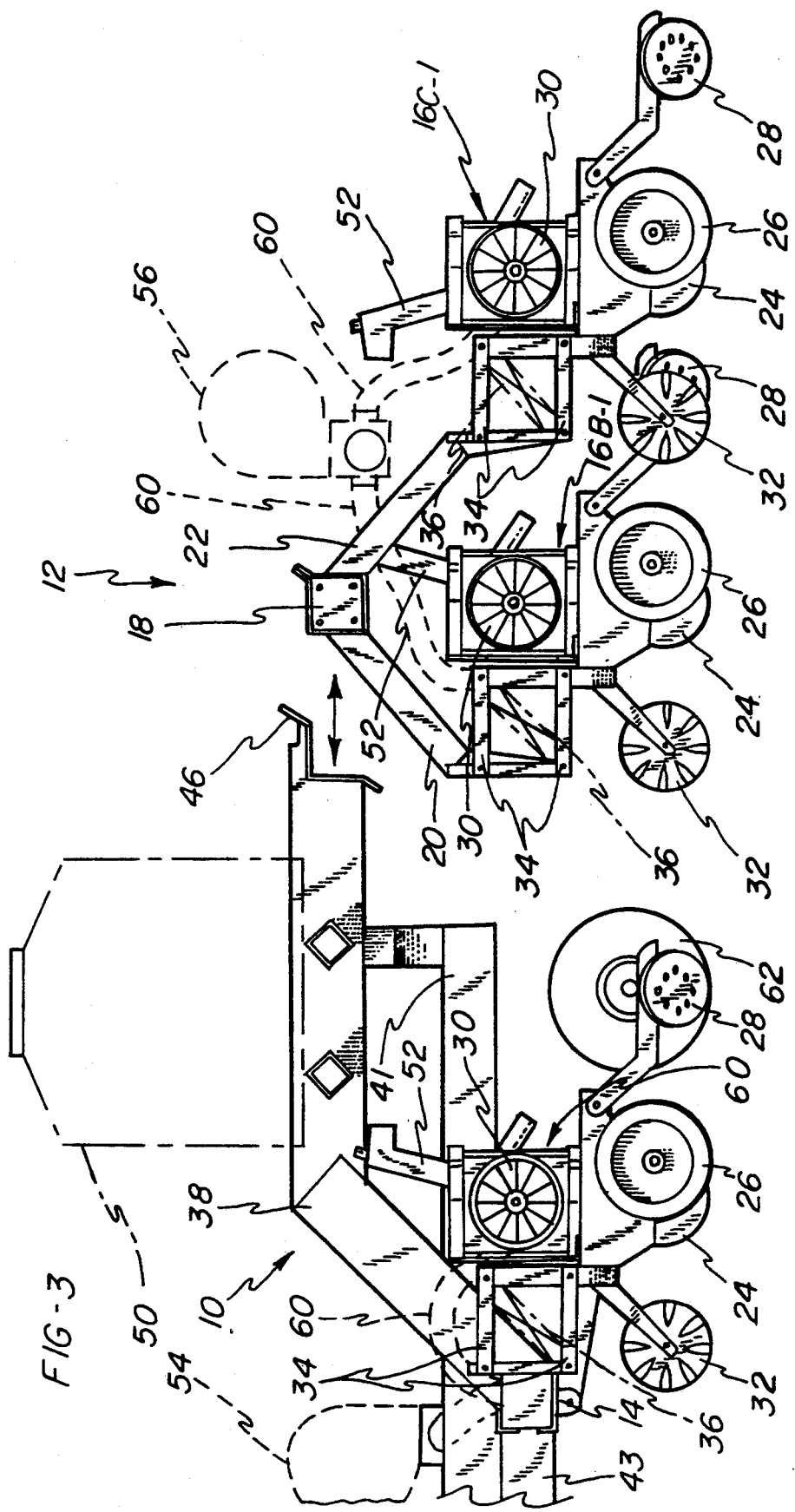
FIG. 3 is a side elevational view showing the front and rear planting structures of the planting implement detached from each other.

The planter units 16 used in the present planting implement are substantially identical to each other and, as best seen in FIGS. 2 and 3, comprise standard planting unit components including, for example, a double disk furrow opener 24, a pair of four and a half inch wide depth gauge wheels 26 located on either side of the furrow opener 24, a pair of press wheels 28 for closing the furrow, and a seed metering unit 30 for providing singulation of seed deposited into the furrow. For the purposes of the present invention, it is preferable to provide a very short seed drop to enhance accurate seed spacing, and it is also preferable for the lower end of the seed drop to open in close proximity to the depth gauge wheels 28 and furrow opener 24 in order to ensure uniformity in depth control. The seed metering unit 30 is of conventional design such as is disclosed in U.S. Pat. Nos. 3,888,387 and 4,450,979, both assigned to the assignee of the present invention, and which are incorporated herein by reference.

It should be noted that a conventional seed metering unit drive mechanism (not shown) is provided and is preferably of the type driven by rotation of a support/-drive wheel or a hydraulic motor for the planter unit 16. Further, it should be noted that a coulter blade 32 may be provided to cut through debris and residue when planting in no-till soil conditions.

Each of the planter units 16 is supported for vertical movement by a conventional parallelogram structure comprising parallel linkage bars 34 which permit the planter unit 16 to move vertically while being maintained in a constant horizontal orientation relative to the ground. In addition springs, illustrated diagrammatically by element 36 in FIGS. 2 and 3, may be provided extending between the linkages 34 to provide a controlled predetermined downward bias for the planter units 16. Thus, it should be apparent that the planter units 16 of the present invention are vertically movable independently of each other whereby the planter units 16 are permitted to follow the contours of a supporting ground surface independently of each other in order to ensure that the seeds for each row are planted at a constant depth. It should further be noted that by providing two relatively wide gauge wheels 26, the individual planter units 16 are further assured of consistently placing seeds at a predetermined depth within the ground, as is characteristic of row crop planters.

Referring to FIG. 4, the particular location of each of the planter units 16 relative to each other is illustrated. Initially, it should be noted that the planter units 16 of each of the planter unit gangs 16A, 16B and 16C are spaced substantially the same distance A from each other wherein the spacing A corresponds to the widest row spacing available for use when the planting implement is operated to plant row crops. For the purposes of the present description, the distance A corresponds to a row spacing of 30 inches. In addition, the second gang of planter units 16C is offset from the first gang of planter units 16B a predetermined spacing B in the lateral direction wherein the predetermined spacing B corresponds to one-third the distance A. Similarly, the front gang of planter units 16A is offset in the lateral direction from the first gang and second gang of planter units 16B and 16C by the predetermined distance B. Thus, it can be seen that the first gang and second gang of planter units 16B and 16C provide two additional rows of seeds between the rows planted by the front gang of planter units 16A and, in the present embodiment wherein the distance A is equal to 30 inches, the row spacing resulting from using the rear planting structure 12 in cooperation with the front planting structure 10 is 10 inches which corresponds to a typical drill spacing for use in planting high population, high yielding grain such as wheat, oats, barley and other crops which are preferably planted in narrowly spaced rows.

Referring to FIGS. 1-4, it should be noted that the base frame 14 is detachably coupled to the interplant frame 18 by a pair of coupling arms 38, 40 extending in a longitudinal direction rearwardly and upwardly from the base frame 14. In addition, the coupling arms 38, 40 are held in spaced relation to each other by a pair of spacer rails 42, 44. The coupling arms 38, 40 each include a respective coupling end 46, 48 each of which is preferably detachably coupled to the interplant frame 18 by means of a bolt connection such that the front planting structure 10 and rear planting structure 12 may be quickly connected to and disconnected from each other. Thus, the front planting structure 10 may be disconnected from the rear planting structure 12 to perform a row crop planting operation, and the rear planting structure 12 may be quickly coupled to the front planting structure 10 to perform a drill or narrow row crop planting operation.

Consequently, the frame arrangement of the present invention is very flexible to provide for a variety of conventional planting configurations including 30 inch row crop spacing, 10 inch solid row spacing, 15 inch interplant spacing, 7 inch twin row spacing and skip row spacing. Further, the frame arrangement may be configured to provide a wide variety of other planting configurations to meet specific individual needs. In addition, such individual needs are met without limiting the planter to a single configuration in that the rear planting structure 12 may be detached from the front planting structure 10 such that the front planting structure 10 defines an alternative planting configuration.

As may be further seen in FIGS. 2 and 3, the coupling arms 38, 40 may be used to support a central seed bin 50, depicted by phantom lines in the drawings, and a brace 41 may also be provided for further supporting the bin 50 wherein the brace 41 is attached to a tongue 43 for the implement. The seed bin 50 is preferably part of a central seed supply system for supplying seed to metering unit bins 52 on each of the planter units 16 in a manner which is fully described in copending U.S. application Ser. No. 08/043,563, filed Apr. 7, 1993 and assigned to the assignee of the present invention, which application is incorporated herein by reference.

A pair of blowers 54 and 56 mounted on the tongue 41 and interplant frame 18, respectively, are provided for supplying air to the seed metering units 30. The air from the blowers 54, 56 may be conveyed through conventional hoses 58 and 60 as well as through the base frame 14 which is formed as a hollow tubular member. Additional blowers (not shown) may also be provided to supply air to the central distribution system for conveying seed to the metering units 30, as described in the above-referenced patent application.

The planting implement is further provided with transport wheels 62 which are pivotally mounted to the base frame 14, and a conventional cylinder actuated mechanism (not shown) may be provided connected between the transport wheels 62 and the base frame 14 for pivoting the front and rear planting structures 10, 12 upwardly out of contact with the ground to permit transport of the implement.

It should be noted that by providing the elevated interplant frame 18 in combination with the coupling arm structure of the present invention, it is possible to position the first and second gangs of planter units 16B and 16C closely adjacent to each other, and it is additionally possible to position the first gang of planter units 16B in close proximity to the front gang of planter units 16A. The close positioning of the gangs of planter units 16A, 16B and 16C relative to each other is particularly important where the spacing between rows is narrow in that during any directional change of the planter implement, the front to rear spacing of the planter units 16 in the planting implement will have an effect on the spacing between adjacent rows formed by the implement. Specifically, planter units 16 in the rear of the implement will follow a slightly different, or non-parallel, path than planter units 16 in the front of the implement as the implement is pulled along a curved path, and the difference in the paths followed by the planter units 16 increases as the length of the implement increases. Thus, the construction of the planting implement with a compact front to rear dimension provides for increased control over the row spacing.

It should also be apparent that the compact construction of the present planting implement is provided without sacrificing the advantages provided by the planter units 16 which are normally associated with a row crop planter. This is particularly significant in that the conventional planter unit construction used in the present invention incorporates gauge wheels located such that the dimension from the outside of one gauge wheel to the outside of the other gauge wheel is approximately 13 inches. Thus, in order to obtain a spacing between rows on the order of 10 inches, it is necessary to provide overlap between the planter units forming adjacent planted rows of seeds. The present invention permits such an overlap between planter units while also maintaining the compact structure necessary for providing controlled spacing between adjacent rows.

In addition, the offset or staggered arrangement of the planter units 16 is conducive to use of the present implement in no-till conditions in that the lateral spacing between the planter units 16 permits debris and residue to pass through the implement without collecting in front of the planter units.

It should further be noted that the design of the rear planting structure is such that the first and second gangs of planter units may be positioned to plant equally spaced rows. In other words, the planter units of each gang could be spaced apart a distance equal to two-thirds of the distance A, and with the first and second gangs offset from each other the distance B. In this configuration, it would be possible to plant drill spaced crops using the rear planting unit 12 independently of the front planting unit 10.

Finally, the two part configuration of the frame structure permits the front and rear planting structures to be used together for a drill or narrow row crop planting operation, and alternatively permits the front planting structure to be used independently of the rear planting structure for a row crop planting operation.

While the form of apparatus herein described constitutes a preferred embodiment of the invention, it is to be understood that the invention is not limited to this precise form of apparatus, and that changes may be made therein without departing from the scope of the invention, which is defined in the appended claims.

What is claimed is:

1. An agricultural planting implement comprising:
    an interplant frame including an elongated bar extending in a lateral direction;
    a first gang of planter units mounted to said interplant frame bar and extending in said lateral direction;
    a second gang of planter units mounted to said interplant frame bar spaced rearwardly from said first gang of planter units, said second gang of planter units being offset from said first gang of planter units in said lateral direction,
    each said planter unit comprising a furrow opener and a seed metering unit and at least two of said planter units being positionable relative to each other to provide a drill spacing between said at least two of said planter units; and
    wherein said first gang of planter units extend rearwardly to locations between said second gang of planter units whereby said first and second gangs of planter units overlap each other in a front to rear direction.

2. The planting implement as in claim 1, wherein each said planter unit further includes a pair of gauge wheels comprising a gauge wheel located on either side of said furrow opener.

3. The planting implement as in claim 2, wherein each said pair of gauge wheels is mounted for independent vertical movement relative to said frame and is biased downwardly with a predetermined pressure whereby each said pair of gauge wheels is adapted to follow the contours of a supporting ground surface.

4. An agricultural planting implement comprising:
    an elongated interplant frame including an elongated bar extending in a lateral direction;
    a first gang of planter units mounted to said interplant frame bar and extending in said lateral direction;
    a second gang of planter units mounted to said interplant frame bar spaced rearwardly from said first gang of planter units, said second gang of planter units being offset from said first gang of planter units a predetermined distance in said lateral direction, and
    wherein said first gang of planter units is supported by a pivoting linkage attached to first support arm means extending downwardly and forwardly from and rigidly attached to said interplant frame bar and said second gang of planter units is supported by a pivoting linkage attached to second support arm means extending downwardly and rearwardly from and rigidly attached to said interplant frame bar.

5. The planting implement as in claim 4, including an elongated base frame extending in said lateral direction and a front gang of planter units mounted to said base frame, said base frame being detachably attached to said interplant frame.

6. The planting implement as in claim 5, wherein said front gang of planter units is located between said base frame and said interplant frame whereby said front gang of planter units is located in close proximity to said first gang of planter units.

7. The planting implement as in claim 1, wherein said second gang of planter units is offset from said first gang of planter units a predetermined distance in said lateral direction.

8. The planting implement as in claim 7, wherein said predetermined distance is approximately ten inches.

9. An agricultural planting implement comprising:
    an elongated interplant frame including an elongated bar extending in a lateral direction;
    a first gang of planter units mounted to said interplant frame bar and extending in said lateral direction;
    a second gang of planter units mounted to said interplant frame bar spaced rearwardly from said first gang of planter units, said second gang of planter units being offset from said first gang of planter units a predetermined distance in said lateral direction, and
    including a front gang of planter units coupled to said interplant frame wherein said front gang of planter units is offset from said first gang of planter units a distance equal to said predetermined distance in said lateral direction.

10. An agricultural planting implement comprising:
    a front planting structure including a front gang of planter units supported on a base frame;
    a rear planting structure including rear planter units supported on an interplant frame, said interplant frame being detachably attached behind said base frame; and
    wherein said planter units of said front planting structure are spaced from each other a sufficient distance to perform a row crop planting operation and said planter units of said rear planting structure are positioned to plant seed in at least two rows in between adjacent rows formed by said front planting structure such that said planting implement is adapted to be used for a row crop planting operation and for a drill planting operation.

11. The planting implement as in claim 10, wherein each of said planter units comprises a seed metering unit for providing singulation of seeds.

12. The planting implement as in claim 11, wherein each planter unit further comprises a furrow opener and a gauge wheel located on either side of said furrow opener to accurately control the depth of a furrow formed by said furrow opener.

13. The planting implement as in claim 10, wherein said rear planting structure comprises a first gang of planter units and a second gang of planter units located behind and offset from said first gang of planter units a predetermined distance in a lateral direction.

14. The planting implement as in claim 13, wherein said predetermined distance is equal to one-third the spacing between adjacent planter units of said front gang of planter units.

15. The planting implement as in claim 10, wherein said front planting structure includes a laterally extending base frame for supporting said front gang of planter units and said rear planting structure includes a laterally extending interplant frame for supporting said rear planter units, said front planter structure further including a coupling arm extending upwardly and rearwardly for detachably coupling to said interplant frame.

16. The planting implement as in claim 15, including a seed bin supported on said coupling arm for supplying seed to said planter units.

17. The planting implement as in claim 15, wherein said rear planting structure includes a first gang of planter units supported by first support arm means extending downwardly and forwardly from said interplant frame and a second gang of planter units supported by second support arm means extending downwardly and rearwardly from said interplant frame.

18. The planting implement as in claim 17, wherein said front gang of planter units extend rearwardly of said base frame, said first gang of planter units extend rearwardly of said first support arm means and said second gang of planter units extend rearwardly of said second support arm means.

19. An agricultural planting implement for performing row crop and drill planting operations, said planting implement comprising:

a front planting structure including an elongated base frame extending in a lateral direction and a front gang of planter units extending rearwardly from said base frame;

a rear planting structure including an elongated interplant frame extending in said lateral direction, first support arm means extending downwardly and forwardly from said interplant frame, second support arm means extending downwardly and rearwardly from said interplant frame, a first gang of planter units supported on said first support arm means and a second gang of planter units supported on said second support arm means;

each said planter unit including a seed metering unit for providing singulation of seeds, a furrow opener and a gauge wheel located on either side of said furrow opener, each said planter unit being mounted for independent vertical movement in response to varying contours of ground to be planted;

a pair of coupling arms mounted to said base frame and extending upwardly and rearwardly for detachably coupling to said interplant frame;

said second gang of planter units being offset from said first gang of planter units a predetermined distance in said lateral direction and said front gang of planter units being offset from said first gang and said second gang of planter units said predetermined distance in said lateral direction; and wherein said planting implement is configured to plant seed at a row crop spacing when said front planting structure is detached from said rear planting structure and said planting implement is configured to plant seed at a drill crop spacing when said front planter structure is attached to said rear planter structure.

20. The planting implement as in claim 19, wherein adjacent planter units in each of said gangs of planter units have a center-to-center spacing equal to three times said predetermined distance.

21. The planting implement as in claim 1, wherein each of said planter units of said first and second gangs of planter units includes a linkage structure located at the front of a respective planter unit providing for independent vertical movement of each of the respective planter units.

22. The planting implement as in claim 1, wherein said first gang of planter units extend rearwardly from a location in front of said elongated bar to a location behind said elongated bar.

23. The planting implement as in claim 10, wherein each of said planter units of said front and rear gangs of planter units includes a linkage structure located at the front of a respective planter unit providing for independent vertical movement of each of the respective planter units.

* * * * *